US009261942B2

(12) United States Patent
Breen et al.

(10) Patent No.: US 9,261,942 B2
(45) Date of Patent: Feb. 16, 2016

(54) REDUCING POWER CONSUMPTION OF A REDUNDANT POWER SYSTEM UTILIZING SLEEP POWER CONSUMPTION CONSIDERATIONS FOR POWER SUPPLY UNITS WITHIN THE REDUNDANT POWER SYSTEM

(71) Applicant: Dell Products L.P., Round Rock, TX (US)

(72) Inventors: John J. Breen, Round Rock, TX (US); Mark A. Muccini, Georgetown, TX (US); Wayne Kenneth Cook, Round Rock, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 456 days.

(21) Appl. No.: 13/724,270

(22) Filed: Dec. 21, 2012

(65) Prior Publication Data

US 2014/0181544 A1    Jun. 26, 2014

(51) Int. Cl.
*G06F 1/32*    (2006.01)
*G06F 1/26*    (2006.01)
*H02J 1/10*    (2006.01)
*H02J 1/14*    (2006.01)

(52) U.S. Cl.
CPC .............. *G06F 1/3234* (2013.01); *G06F 1/263* (2013.01); *H02J 1/102* (2013.01); *H02J 1/14* (2013.01)

(58) Field of Classification Search
CPC .......... G06F 1/3234; G06F 1/263; H02J 1/14; H02J 1/102
See application file for complete search history.

(56) References Cited

U.S. PATENT DOCUMENTS

| | | | |
|---|---|---|---|
| 7,512,824 B2 * | 3/2009 | Artman et al. | 713/340 |
| 7,906,871 B2 * | 3/2011 | Freeman et al. | 307/85 |
| 8,261,102 B2 * | 9/2012 | Cheng et al. | 713/300 |
| 8,312,300 B2 * | 11/2012 | Domingo et al. | 713/300 |
| 8,645,739 B2 * | 2/2014 | Berke et al. | 713/324 |
| 2003/0172150 A1 * | 9/2003 | Kennedy | 709/224 |
| 2005/0172157 A1 * | 8/2005 | Artman et al. | 713/300 |
| 2010/0064150 A1 * | 3/2010 | Higuchi | 713/300 |

* cited by examiner

*Primary Examiner* — Abdelmoniem Elamin
(74) *Attorney, Agent, or Firm* — Isidore PLLC (57) ABSTRACT

A method, system, and information handling system provides better system power consumption of a redundant power system having a plurality of power supply units (PSUs) by taking into consideration each PSU's sleep power consumption during selection of one or more PSUs to place into a "hot spare" sleep mode. For each PSU, power efficiency data at different load ratings are measured and stored. During the PSU selection, a calculation of system power consumption is conducted on each of several configurations where a different PSU is hypothetically disabled. Each calculation takes into consideration both the sleep power consumption of a disabled PSU and power efficiency data of an enabled PSU. Selection of one or more PSUs to disable is determined according to the configuration yielding the lower or lowest system input power consumption based on the results of the calculations.

20 Claims, 7 Drawing Sheets

Table 5.1

| % load | PSU Efficiency | |
|---|---|---|
| | PSU-1 | PSU-2 |
| 10 | 87.93% | 87.83% |
| 20 | 92.06% | 91.96% |
| 30 | 93.16% | 93.06% |
| 40 | 93.81% | 93.71% |
| 50 | 93.87% | 93.63% |

Table 5.2

| % load | PSU Input Power | |
|---|---|---|
| | PSU-1 | PSU-2 |
| 10 | 85.30 | 85.40 |
| 20 | 162.93 | 163.14 |
| 30 | 241.51 | 241.79 |
| 40 | 319.79 | 320.05 |
| 50 | 399.51 | 400.52 |
| Sleep | 2.858 | 4.263 |

Table 5.3

| % load | System Power Consumption (Watts) | | | |
|---|---|---|---|---|
| | PSU-1 Enabled / PSU-2 Disabled | PSU-1 Disabled / PSU-2 Enabled | Selected Configuration | Watts Saved |
| 10 | 89.56 | 88.28 | PSU-1 Disabled / PSU-2 Enabled | 1.28 |
| 20 | 167.20 | 166.03 | PSU-1 Disabled / PSU-2 Enabled | 1.17 |
| 30 | 245.77 | 244.68 | PSU-1 Disabled / PSU-2 Enabled | 1.10 |
| 40 | 324.05 | 322.94 | PSU-1 Disabled / PSU-2 Enabled | 1.11 |
| 50 | 403.77 | 403.41 | PSU-1 Disabled / PSU-2 Enabled | 0.36 |

REDUCING POWER CONSUMPTION OF A REDUNDANT POWER SYSTEM UTILIZING SLEEP POWER CONSUMPTION CONSIDERATIONS FOR POWER SUPPLY UNITS WITHIN THE REDUNDANT POWER SYSTEM

BACKGROUND

1. Technical Field

The present disclosure generally relates to a redundant power system used to supply power to an information handling system, and more particularly to a system and method for reducing power consumption when selectively putting one or more individual power supply units (PSUs) of a redundant power system to sleep.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system (IHS), such as a computer server or a blade server system, often utilizes a redundant power system to achieve uninterrupted and reliable supply of power. With a redundant power system (RPS), there are at least two power supply units (PSUs) working in concert to collectively provide uninterrupted power to an IHS. Occasionally, for an RPS having two PSUs, there are circumstances under which one PSU supplies power to the IHS while the other PSU is put into the "hot spare" state. The "hot spare" state refers to a state where the PSU is disabled from actively supplying power by being put into a sleep mode, while remaining in readiness to supply power without any startup delay when required. Thus, in an RPS having two PSUs, if one PSU is detected as failed, the other PSU maintained in the "hot spare" state can pick up where the failed PSU left off by supplying power without any delay, thereby enabling the IHS to receive uninterrupted power.

In the conventional approach to a PSU shutoff situation, the PSU having the lower or lowest power efficiency is automatically selected to be shut off. The conventional approach, however, overlooks the fact that when a PSU is disabled by being put into the "hot spare" state, the disabled PSU still consumes power in order to be held in readiness to supply power. As a result, selecting the one PSU to disable by using the conventional approach at times results in system power consumption higher than what would have resulted if the other PSU was selected for disabling.

Accordingly, aspects of the disclosure recognize that, in order to truly minimize the overall power consumption of the RPS in a PSU-shutoff situation, there is a need for a different approach than the aforementioned conventional approach of automatically selecting the PSU with the lower power efficiency to disable.

BRIEF SUMMARY

Disclosed is a system and method for reducing overall power consumption by a redundant power system (RPS) having a plurality of power supply units (PSUs). The disclosed system and method provides better system power consumption by taking into consideration each PSU's sleep power consumption during a selection of one or more PSUs to be placed into a "hot spare" sleep mode. For each PSU, power efficiency data at different load ratings are measured and stored therein. During the PSU selection, calculation of system power consumption is conducted on each of several configurations where a different PSU is hypothetically disabled. Each calculation takes into consideration both the sleep power consumption of a disabled PSU and power efficiency data of an enabled PSU. Selection of one or more PSUs is determined according to the configuration yielding the lower or the lowest system input power consumption based on the calculations.

One aspect of the disclosure provides a method of reducing power consumption of an RPS having a plurality of PSUs to supply power to a load, such as an information handling system. The method comprises: receiving operational data for each PSU, including a current load rating, efficiency data for a set of load ratings, and sleep power consumption data. The method further includes: computing a system power consumption for each of a plurality of configurations, where at least one different PSU is hypothetically disabled from supplying power while each remaining PSU is hypothetically enabled to supply power required for the load, each computation taking into consideration the sleep power consumption data of the hypothetically disabled at least one PSU. The method also includes: comparing a resulting plurality of computed system power consumptions to identify which specific configuration of the plurality of configurations yields a lowest system power consumption; and in response to a determination that system power consumption can be reduced by implementing the specific configuration while providing a required supply power to the load, implementing the specific configuration of the PSUs within the RPS. The at least one PSU is disabled, while the remaining PSUs are enabled. In one or more embodiments, the method includes triggering the computing and comparing processes in response to detection of a hot spare condition within the RPS. The specific configuration is implemented while a present operating condition of the RPS remains the hot spare condition.

According to another aspect, disclosed is a system for reducing power consumption. The system comprises: a redundant power system having a plurality of power supply units (PSUs) supplying power to a load; and a PSU selector communicatively coupled to at least two of the plurality of the PSUs and configured to selectively disable at least one PSU from the plurality of PSUs in order to reduce system power consumption in connection with supplying power to the load. Accordingly, the PSU selector: receives operational data for each PSU, including a current load rating, efficiency data for a set of load ratings, and sleep power consumption data; and computes a system power consumption for each of a plurality of configurations, where at least one different PSU is hypothetically disabled from supplying power while each remaining PSU is hypothetically enabled to supply power required for the load, each computation taking into consideration the sleep power consumption data of the hypothetically disabled at least one PSU. Then, the PSU selector: compares a resulting plurality of computed system power consumptions to identify which specific configuration of the plurality of configurations yields a lowest system power consumption; and in response to a determination that system power consumption can be reduced by implementing the specific configuration while providing a required supply power to the load, implements the specific configuration of the PSUs within the RPS. The at least one PSU is disabled, while the remaining PSUs are enabled. In one or more embodiments, the PSU selector performs the computing and comparing processes in response to detection of a hot spare condition within the RPS. The specific configuration is implemented while a present operating condition of the RPS remains the hot spare condition.

According to yet another aspect, disclosed is an information handling system comprising a processor, a power system and a memory. The power system has a plurality of power supply units (PSUs) operated to supply power to the information handling system and a power management controller (PMC) communicatively coupled to the processor. The memory has power management code which, when executed by the processor, causes the processor to configure the PMC to selectively disable at least one PSU from the plurality of PSUs in order to reduce system power consumption in connection with supplying power to the information handling system. The processor operates in tandem with the PMC to: receive operational data for each PSU, including a current load rating, efficiency data for a set of load ratings, and sleep power consumption data; and compute a system power consumption for each of a plurality of configurations, where at least one different PSU is hypothetically disabled from supplying power while each remaining PSU is hypothetically enabled to supply power required for the load, each computation taking into consideration the sleep power consumption data of the hypothetically disabled at least one PSU. The processor and PMC further: compare a resulting plurality of computed system power consumptions to identify which specific configuration of the plurality of configurations yields a lowest system power consumption; and in response to a determination that system power consumption can be reduced by implementing the specific configuration while providing a required supply power to the load, implement the specific configuration of the PSUs within the RPS. The at least one PSU is disabled, while the remaining PSUs are enabled. In one or more embodiments, the processor performs the computing and comparing processes in response to detection of a hot spare condition within the RPS. The specific configuration is implemented while a present operating condition of the RPS remains the hot spare condition.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provides a system and method for reducing power consumption by a redundant power system having a plurality of power supply units (PSUs), The system and method provides better system power consumption by taking into consideration each PSU's sleep power consumption during a selection of one or more PSUs to be placed into a "hot spare" sleep mode (i.e., disabled from supplying power to the attached load). For each PSU, power efficiency data at different load ratings are measured and stored therein. During the PSU selection, calculation of system power consumption is conducted on each of several configurations where a different PSU is hypothetically disabled. Each calculation takes into consideration both the sleep power consumption of a disabled PSU and power efficiency data of an enabled PSU. Selection of one or more PSUs is determined according to the configuration yielding the lower or the lowest system input power consumption based on the calculations.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

Terms used herein are intended to be construed broadly and are not intended to be limiting. Thus, as used herein, "a," "an," and "one" include the plural, "or" includes "and/or," and reference to a numerical value includes at least that value, unless the context clearly calls for otherwise.

Those of ordinary skill in the art will appreciate that the hardware components and basic configuration depicted in the following figures may vary. For example, the illustrative components within information handling system 100, components of redundant power system 180, and PSU selector 220, are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). If a reference numeral is once used to refer to a plurality of like elements, unless required otherwise by context, the reference numeral may refer to any, a subset of, or all of, the like elements in the figures bearing that reference numeral. The specific identifiers/names and reference numerals assigned to the elements are provided solely to aid in the description and are not meant to imply any limitations (structural or functional or otherwise) on the described embodiments.

Various aspects of the disclosure are described from the perspective of an information handling system. For purposes of this disclosure, an information handling system, such as information handling system 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
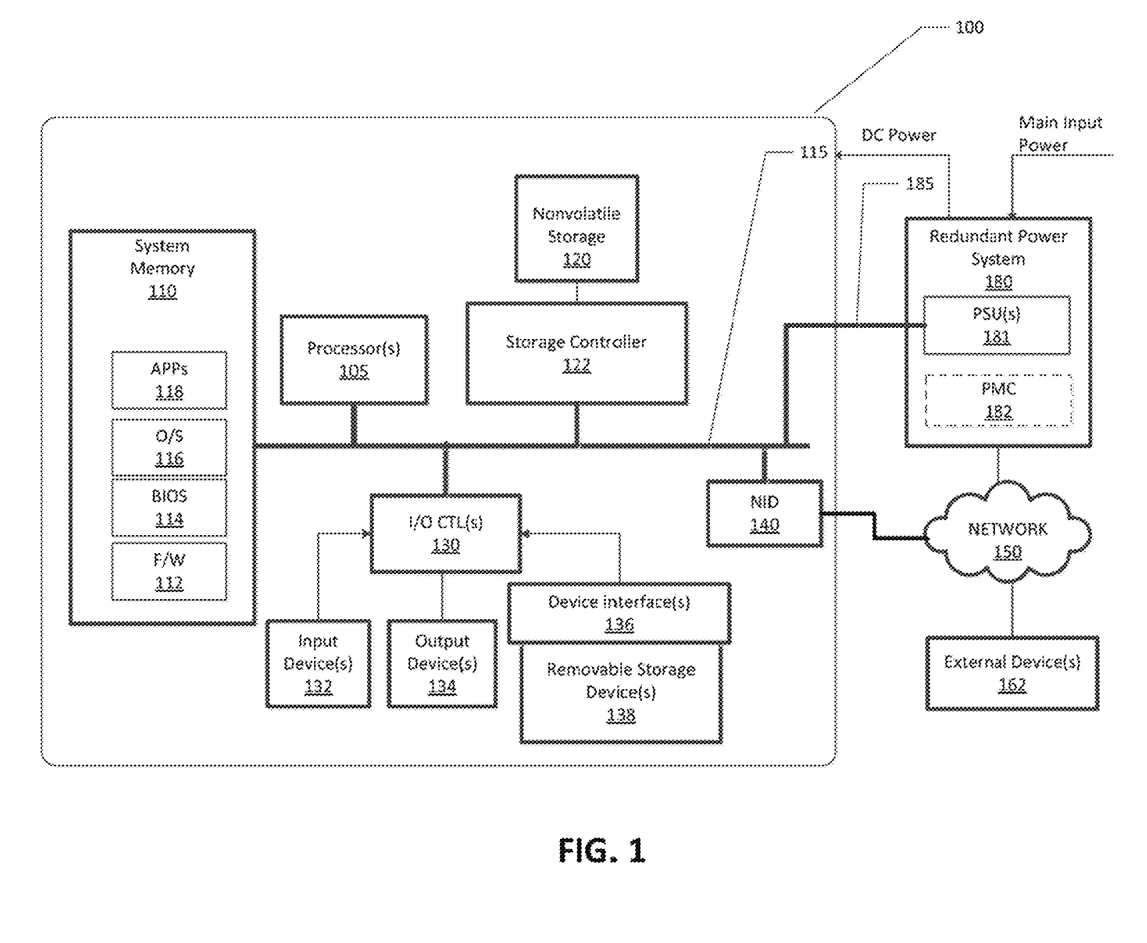
FIG. 1 is a block diagram illustrating an example information handling system and a redundant power system to which the present disclosure is applicable, according to one embodiment.

With reference now to the figures, and beginning with FIG. 1, there is depicted a block diagram representation of an example information handling system 100 powered by a redundant power system to which one or more embodiments of the present disclosure are applicable. Information handling system 100 includes at least one central processing unit (CPU) or processor 105 coupled to system memory 110 via system interconnect 115. System interconnect 115 can be interchangeably referred to as a system bus, in one or more embodiments. Also coupled to system interconnect 115 is nonvolatile storage (e.g., NVRAM) 120. One or more software or firmware modules can be loaded into system memory 110 during operation of information handling system 100. Specifically, in one embodiment, system memory 110 can include therein a plurality of such modules, including one or more of firmware (F/W) 112, basic input/output system (BIOS) 114, operating system (O/S) 116, and application(s) 118. These software or firmware modules have varying functionality when their corresponding program code is executed by CPU 105 or secondary processing devices within information handling system 100.

Information handling system 100 further includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be associated with IHS 100. Device interface(s) 136 can be utilized to enable data to be read from or stored to corresponding removal storage device(s) 138, such as a compact disk (CD), digital video disk (DVD), flash drive, or flash memory card. In one or more embodiments, device interfaces 136 can further include General Purpose I/O interfaces such as $I^2C$, SMBus, and peripheral component interconnect (PCI) buses.

Information handling system 100 comprises a network interface device (NID) 140. NID 140 enables information handling system 100 and/or components within information handling system 100 to communicate and/or interface with other devices, services, and components that are located external to information handling system 100. These devices, services, and components can interface with information handling system 100 via an external network, such as example network 150, using one or more communication protocols. Network 150 can be a local area network, wide area network, personal area network, and the like, and the connection to and/or between network and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet. In the illustrative embodiment, one or more external device(s) 162 communicate and/or interface with information handling system 100 via network 150.

Information handling system 100 may receive DC electrical power from a redundant power system (RPS) 180, which can receive power from one or more main external power sources. RPS 180 comprises a plurality of PSUs 181. In one embodiment, the plurality of PSUs 181 can be either identical or substantially similar with respect to one another. In another embodiment, the plurality of PSUs 181 can be different with respect to one another. RPS 180 may optionally further include an internal PSU management controller (PMC) 182, which is an internal module (which can be hardware, software or any combination thereof) that manages and controls operations of the plurality of PSUs 181. Optionally, the plurality of PSUs 181 communicate or interface with information handling system 100 via a communication link 185 (which, in one embodiment, is a Power Management (PM) Bus) coupled to system interconnect 115.

Figure 2:
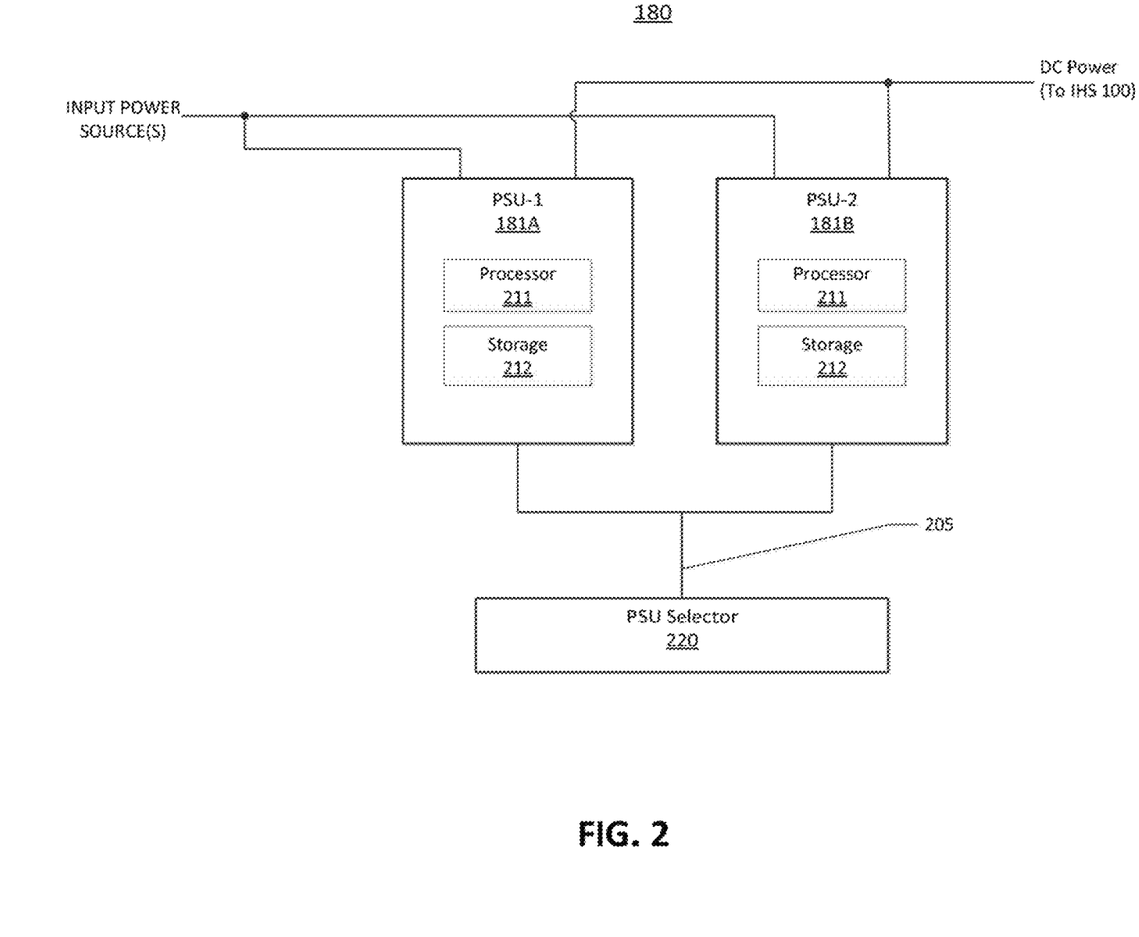
FIG. 2 is a block diagram illustrating an exemplary redundant power supply configuration, according to one or more embodiments of the present disclosure.

FIG. 2 is a block diagram illustrating an exemplary redundant power supply configuration, according to one or more embodiments of the present disclosure. In this configuration, RPS 180 comprises two PSUs 181 that are communicatively coupled to a PSU selector 220 via communication link 205. Each PSU 181 receives power from one or more power sources, and can provide DC Power to IHS 100. Each PSU 181 comprises a processor 211 and storage 212. Storage 212 can be in various forms. For example, storage 212 may comprise random access memory (RAM), registers, read-only memory (ROM), EEPROM, flash memory, hard drive, or any combination thereof. Storage 212 stores software or firmware modules as well as data.

As a skilled artisan readily appreciates, with processor 211 and storage 212, each PSU 181 becomes "intelligent". Particularly, processor 211 can execute software or firmware modules stored in storage 212, using data read from storage 212 as needed, to achieve various functionalities that otherwise cannot be achieved by a PSU not equipped with a processor or a storage unit. For example, a PSU 181 may now be able to collect, calculate and store various operation statistics data for the PSU 181 by taking advantage of the storing capability and capacity of storage 212 as well as computing power of processor 211. The stored operation statistics data may then be used by PSU selector 220 to determine, in a PSU shutoff situation, which PSU(s) should be disabled to achieve the least amount of system power consumption.

PSU selector 220 (which can be software, hardware or any combination thereof) is configured to carry out a method (referred to hereinafter as "PSU-selection method") of selecting, in a PSU shutoff situation, at least one PSU 181 to disable from among the at least two PSUs 181.

As used herein, the term "PSU shutoff situation" refers to a situation applicable to RPS 180 and IHS 100, where, due to power efficiency considerations, disabling at least one PSU 181 and letting the remaining at least one PSU 181 to supply power to IHS 100, can advantageously reduce overall power consumption.

As used herein, the terms "disable", "disabling" and "disabled", when used in connection with a PSU 181, refer to a situation or a state where a PSU 181 is disabled from actively supplying power by being put into a sleep mode while held in readiness to supply power without delay when required.

As used herein, the terms "enable", "enabling" and "enabled", when used in connection with a PSU 181, refer to a situation or a state where a PSU 181 is enabled to actively supply power to a load, such as IHS 100.

As illustrated, PSU selector 220 is communicatively coupled to PSUs 181 via communication link 205. PSU selector 220 and communication link 205 may be implemented in various different forms. In one implementation, PSU selector 220 is an internal module of PMC 182, while communication link 205 may be an internal PM Bus of RPS 180. In another implementation, PSU selector 220 is a software or firmware module resident in system memory 110 of IHS 100, while communication link 205 comprises system interconnect 115 and communication link 185. In yet another embodiment, PSU selector 220 is a module of external device 162, while communication link 205 may either be a direct communication link (such as a PM Bus), or an indirect communication link via network 150, between RPS 180 and the external device 162.

A primary motivator for the present innovation was the realization that energy costs associated with both the operation and cooling of IHSs, such as computer servers, can be a major expense of a data center. With some data centers employing thousands of servers, even the savings of a couple of watts per server can add up to thousands of watts overall. With this knowledge, one known approach to reduce power consumption is to let power-supplying individual PSUs operated at or close to their respective maximum efficiencies.

Figure 7:
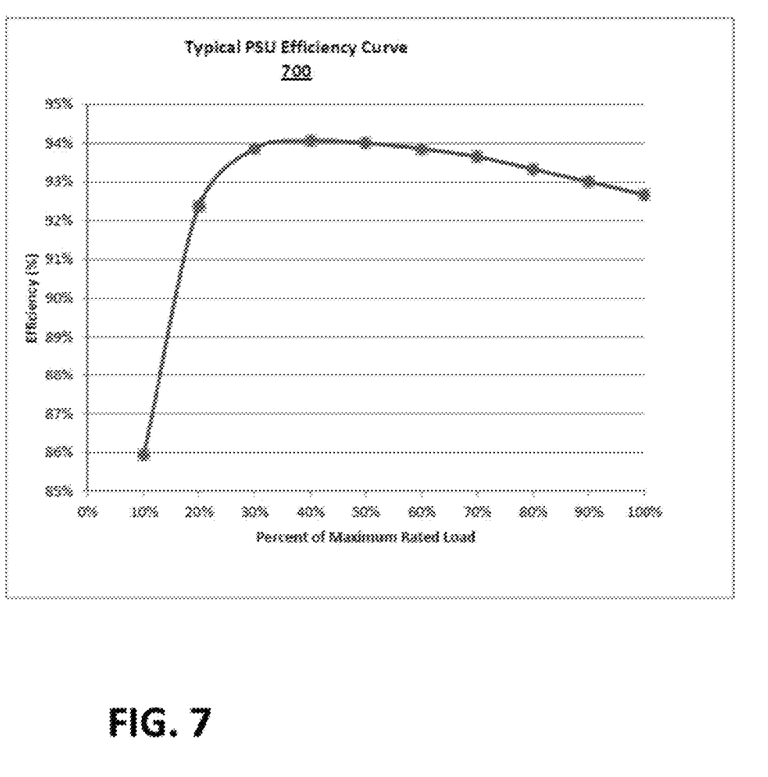
FIG. 7 is a graphical chart with accompanying table illustrating example PSU efficiency ratings based on applied load, according to one embodiment.

FIG. 7 shows curve 700 and table 7.1 illustrates power efficiency values corresponding to different loading conditions for an example PSU. As illustrated, when the output load at which the example PSU operates drops from 30% of the capacity to 10% of the capacity, the power efficiency value of the PSU drops from roughly 94% to roughly 86%. Using an RPS to power an IHS, it is reasonable to expect that each PSU typically operates between 10% and 40% of the PSU's rated load capacity. There are situations where two identical or substantially similar PSUs are both operating considerably below a rated load level, such as 20% load level, where each PSU is at or near a maximum power efficiency. As an example, when two PSUs are both operating at 10% load level, both PSUs are operating at roughly 86% power efficiency, which is 6% less than the roughly 92% power efficiency when one PSU is operating at 20% load level. In such a situation (referred to herein as "PSU shutoff situation"), if one of the two PSUs is shutoff by being put into the "hot spare" state, the power efficiency value for the remaining power-supplying PSU will bump up to roughly 92%, which is a net gain of 6%, thus reducing overall power consumption. Accordingly, in a PSU shutoff situation in connection with two PSUs, it can be advantageous to shut off one PSU and use the remaining PSU to supply power to an IHS. Aspects of the present disclosure presents a method and system for ensuring that the correct PSU within a RPS, as shown in FIG. 2, is selected for shutoff to maximize the energy efficiency of the RPS as a whole.

Figure 3A:
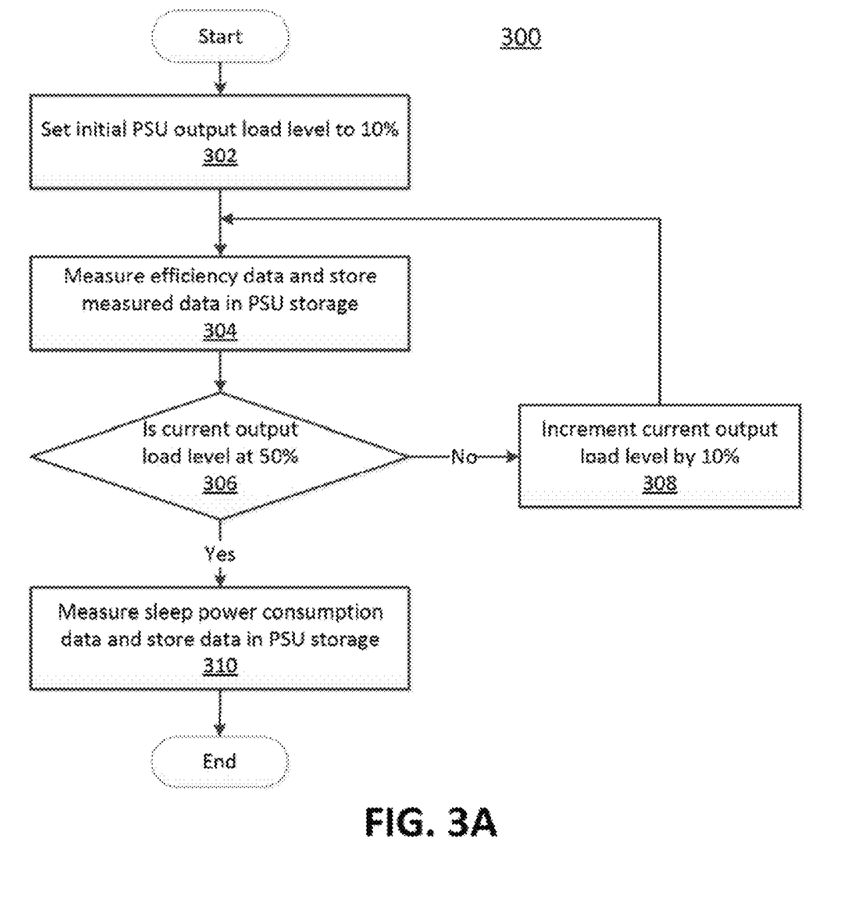
FIG. 3A is a flowchart illustrating an initial data-setup process for power supply units (PSUs), according to one or more embodiments of the present disclosure.

FIG. 3A is a flowchart illustrating a method 300 for performing an initial data-setup process in which statistical (operation) data used in the disclosed PSU-selection method is measured and stored, according to one or more embodiments of the present disclosure. Specifically, in a PSU shutoff situation, not overlooking sleep power consumption of PSUs means taking into consideration not only the power efficiency data of each PSU 181 at different load ratings but also sleep power consumption of each PSU 181. Hence, both power efficiency data (e.g. power efficiency values and input power at different load ratings) and sleep power consumption data for each PSU need to be available in advance of selecting a PSU 181 to disable. The initial data-setup process is designed for each PSU 181 to measure and store both power efficiency data and sleep power consumption data of that PSU.

In measuring power efficiency data at different load levels, only power efficiency data for load levels that do not exceed a threshold value (e.g., 50%) need to be measured. In particular, disabling one or more PSUs 181 to reduce power consumption, as in a PSU shutoff situation, should only be allowed under conditions (referred to hereinafter as "'hot spare' conditions") where such a practice will not likely jeopardize IHS 100 from a conceivable likelihood of power interruption. For example, one of these "hot spare" conditions is that the current load rating of a PSU 181 cannot be near or above a threshold level, such as 50% level, in a two-PSU configuration. Due to this consideration, only power efficiency data for load ratings that do not exceed 50% need to be measured. It is appreciated that the presented curve (FIG. 7), including the values thereon and the present description that references those values provides only a single example, which is not intended to be limiting on the disclosure. In general, the shape of an efficiency versus load curve can dictate at what levels the efficiency measurements are valid. The above-presented curve and following descriptions provide for a 50% threshold value; However, other curves can be generated having higher or lower threshold value percentages that would be applied for that specific implementation of one or more PSUs.

Turning to the initial data-setup process for a target PSU 181, referring to block 302, the initial load level for which power efficiency is measured (referred to as hereinafter "measurement load level") is set to 10%. At block 304, power efficiency data at the current measurement load level is measured and stored in, e.g., storage 212 of the target PSU 181. Power efficiency data for a measurement load level may include the power efficiency value at the measurement load level as well as the input power consumption at the measurement load level. In one embodiment, the measured efficiency data is stored in one or more registers of storage 212. In other embodiments, the measured efficiency data is stored in other forms of storage medium of storage 212. In yet another embodiment, the measured efficiency data is stored in a device remote from the target PSU 181 while accessible by PSU-selector 220.

At decision block 306, if the current measurement load level has not yet reached the threshold 50%, the measuring and storing of power efficiency data continues. Thus, from decision block 306 method 300 proceeds to block 308, where the current measurement load level is incremented by 10%, and then back to block 304. If, at decision 306, the measurement load level has reached the threshold 50%, the measuring of efficiency data is concluded. Thus, method 300 proceeds to block 310, where sleep power consumption for the PSU is measured and stored, e.g., in storage 212 of the target PSU 181. In an alternate implementation, the method process at block 310—namely, measuring and storing of sleep power consumption data—can be performed before the measuring and storing of power efficiency data.

Figure 3B:
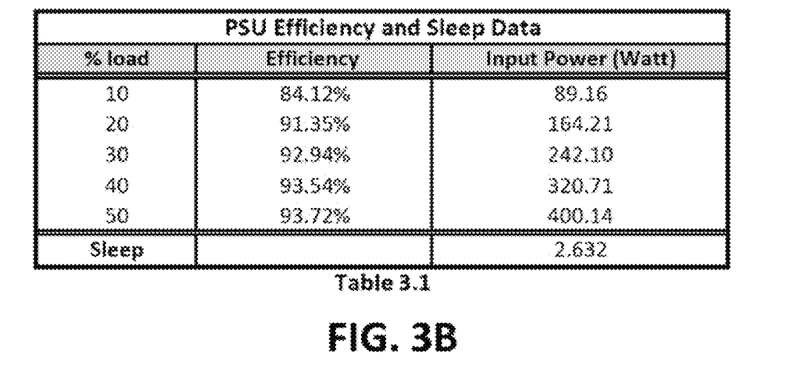
FIG. 3B shows a table illustrating exemplary data measured and stored during the initial data-setup process of FIG. 3A, according to one or more embodiments of the present disclosure.

Table 3.1 shown in FIG. 3B illustrates an example of power efficiency data and sleep power consumption data for a PSU 181, as measured and stored using the initial data-setup process illustrated in FIG. 3A. As shown, there are five measure load ratings, which range from 10% to 50% with a 10% increment. For each measurement load level, the corresponding power efficiency data, which includes the power efficiency value and the input power, are measured and listed in the table. The sleep power consumption is also measured and listed in the table.

As a skilled artisan readily appreciates, the 10% initial measurement load level value used at block 302, or the 10% increment value for a current measurement load level used at block 308, are merely exemplary. Other values may be used in place of these two values without departing from the spirit and scope of the present disclosure. Also, although at decision block 306, the threshold value for output rating is set at 50%, a different threshold value may be used, as long as the condition that no PSU 181 has a current load rating above the used threshold value is a "hot spare" condition.

The initial data-setup process for each PSU 181, as illustrated in FIG. 3, may be automated by automated test equipment (ATE) or manually performed by a human. If the initial process is performed by ATE, instructions affecting the steps and decisions exemplified in FIG. 3A are usually pre-loaded to the ATE before any measuring takes place.

Figure 4:
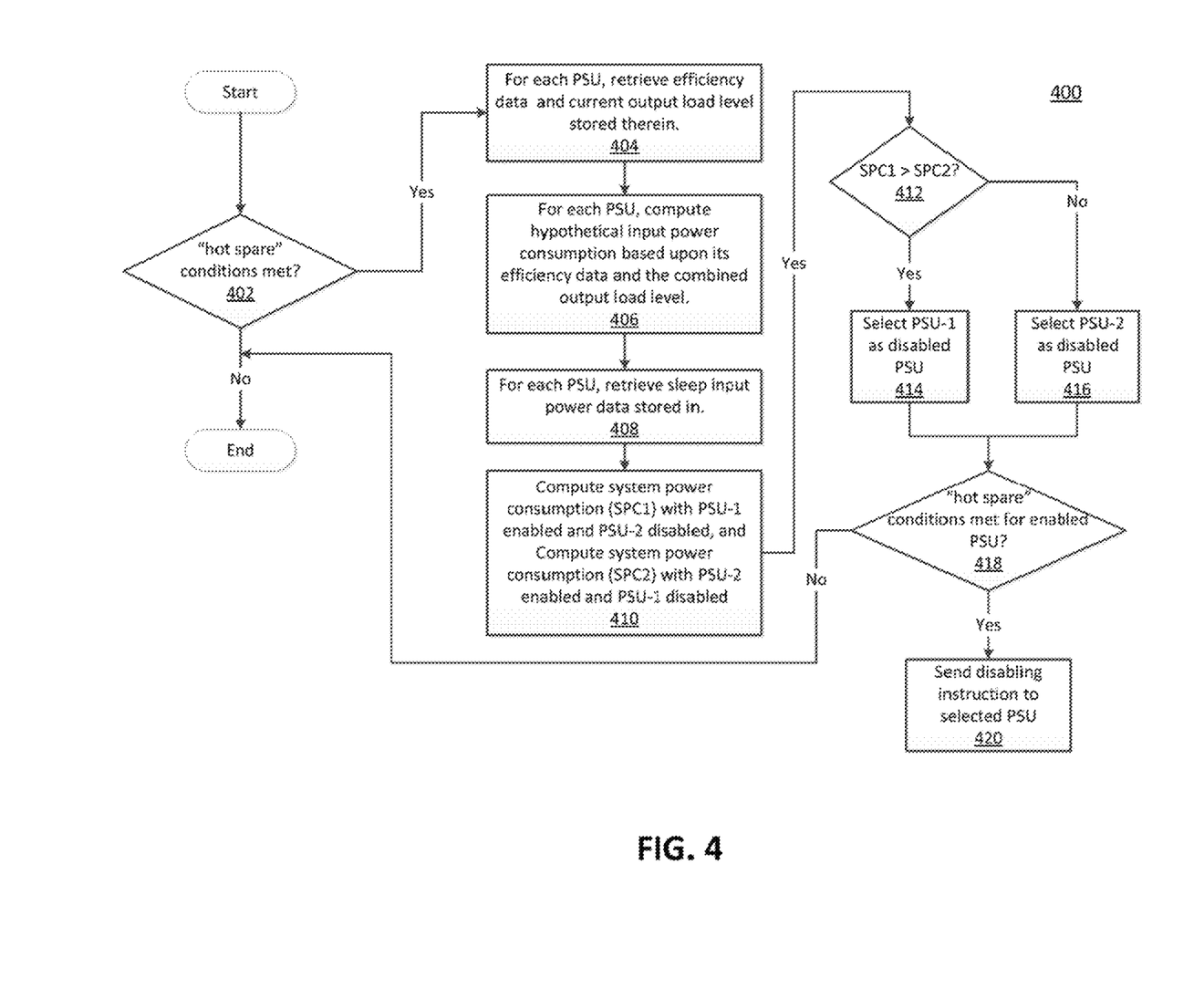
FIG. 4 is a flowchart illustrating an exemplary process of selecting a PSU for disabling in a PSU shutoff situation, according to one or more embodiments of the present disclosure.
Figure 5:
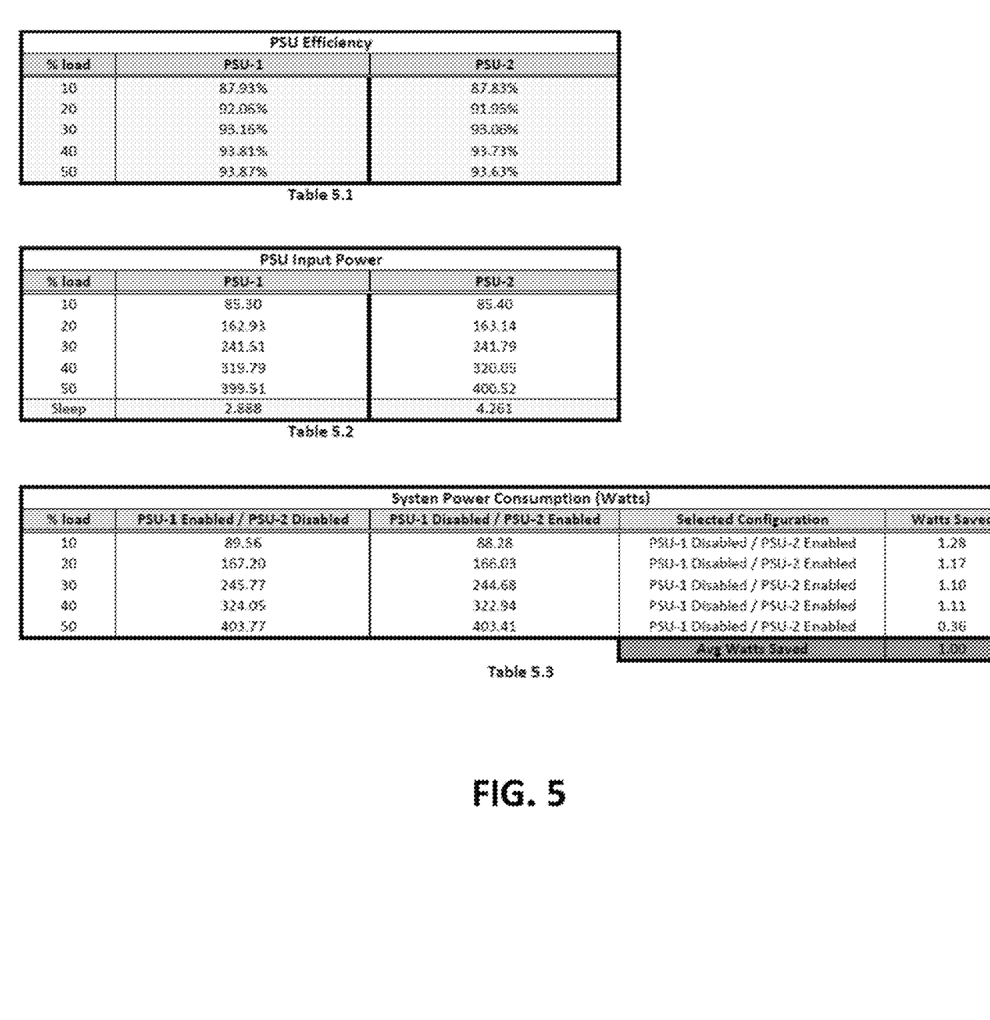
FIG. 5 provides a set of tables illustrating examples of how, in a PSU shutoff situation, a disclosed PSU-selection method provides better power consumption, according to one or more embodiments of the present disclosure.

FIGS. 4 and 5 collectively illustrate a PSU-selection process, as performed by PSU-selector 220, according to one or more embodiments of the present disclosure. FIG. 4 is a flowchart illustrating an exemplary PSU-selection process. FIG. 5 contains a set of tables illustrating an example of how, in a PSU shutoff situation, the disclosed PSU-selection process operates. As can also be identified from tables of FIG. 5, the disclosed PSU-selection process is superior to the conventional PSU-selection scheme in terms of reducing system power consumption.

FIG. 4 illustrates one embodiment of a method 400 for implementing a PSU-selection process for a PSU shutoff situation applicable to RPS 180 having a two-PSU configuration. The method 400 is performed by firmware or software code executing within processing device of PSU selector 220 (FIG. 2) or PMC 182 (FIG. 1). For clarity, and without implying any limitation on alternate embodiments, method 400 shall be described as being performed by PSU selector 220. The PSU-selection process begins at decision 402, at which PSU selector 220 checks whether "hot spare" conditions are met. If the hot spare conditions are not met at decision block 402, PSU selector 220 ends the PSU-selection process and does not disable any of the PSUs 181.

In response to the "hot spare" conditions being met, PSU selector 220 proceeds to block 404, where, for each PSU 181, PSU selector 220 communicates and/or interfaces with the subject PSU via communication link 205 to retrieve respective power efficiency data at different measurement load levels as well as the current load rating stored therein. As noted above in connection with FIG. 3A, power efficiency data are measured and stored through the initial data-setup process. The power efficiency data for a measurement load level may include the power efficiency value there-at as well as the input power consumption there-at. As a skilled artisan readily appreciates, for a PSU 181, the power supplied to a load, such as an IHS 100, equals to the input power consumption times the power efficiency value at the current load rating.

At block 406, for each PSU 181, PSU selector 220 computes a hypothetical input power consumption based on: (1) a corresponding load level (referred to as "combined load level") indicating the combined current load of both PSUs 181, and (2) the power efficiency value at the combined load level, which can be derived from the data retrieved at block 404. The combined load level can be derived from the respective current load ratings of both PSUs as well as the respective power efficiency data of both PSUs, using, e.g., known weighting techniques.

In one example, referring to Table 5.1 shown, for each PSU 181, if the combined load level is one of the specifically indicated measurement load levels, then the input power consumption can be directly obtained from Table 5.2.

In another example, for each PSU 181, if the combined load level is, e.g., 15%, (i.e., not one of the measurement load levels listed in Tables 5.1 and 5.2, then the input power consumption can be calculated using power efficiency data at two or more closest measurement load levels available in Tables 5.1 and 5.2. To compute the input power consumption, in one implementation, the efficiency value at the combined load level is calculated based on efficiency values of the two closest measurement load levels (namely, 10% and 20%) using, e.g., known interpolation techniques. The ideal (100% efficiency) input power consumption at the combined load level can be calculated based on respective efficiency values at the two closest measurement load levels as well as respective input power consumption values at the two closest measurement load levels, using, e.g., known averaging techniques. Finally, the input power consumption at the combined load level is calculated by dividing the calculated ideal input power consumption by the calculated efficiency value at the combined load level.

At block 408, for each PSU 181, PSU-selector 220 retrieves sleep input power data stored in the respective PSU 181. In one or more alternate embodiments, the processes within block 408 may be performed before those processes performed by blocks 404 and 406.

At block 410, PSU selector 220 computes hypothetical system power consumption based on the condition that PSU-1 181A is hypothetically enabled to supply power and PSU-2 181B is hypothetically disabled from supplying power. Thus, the computed system power consumption (referred to hereinafter as "SPC1") is computed as the sum of the input power consumption of PSU-1 181A calculated at block 406 and the sleep power consumption of PSU-2 181B retrieved at block 408. Similarly, PSU selector 220 also computes hypothetical system power consumption based on the condition that PSU-1 181A is hypothetically disabled and PSU-2 181B is hypothetically enabled. Thus, the computed system power consumption (referred to hereinafter as "SPC2") is computed as the sum of the input power consumption of PSU-2 181 calculated at block 406 and the sleep power consumption of PSU-1 181 retrieved at block 408.

At decision block 412, PSU selector 220 compares SPC1 to SPC2. According to one aspect, this comparison identifies the respective hypothetical operating modes of PSU-1 181 and PSU-2 181 that yield the best system consumption. If SPC1 is larger than SPC2, this result of the comparison indicates that the system power consumption that would be consumed when PSU-1 181 is enabled and PSU-2 181 is disabled is larger than the system power consumption that would be consumed when PSU-2 181 is enabled and PSU-1 181 is disabled. Thus, from decision block 412, method 400 proceeds to block 414, where PSU selector 220 selects PSU-1 181A as the PSU to be disabled, with the remaining PSU-2 181B being the PSU to be enabled (i.e., remain active). Similarly, if SPC2 is larger than SPC1, the result indicates that the system power that would be consumed when PSU-2 181B is enabled and PSU-1 181A is disabled is larger than the system input power consumption that would be consumed when PSU-1 181A is enabled and PSU-2 181B is disabled. Thus, from decision block 412 method 400 proceeds to block 416, where PSU selector 220 selects PSU-2 181B as the PSU to be disabled, with the remaining PSU-1 181A being the PSU to be enabled.

After either block 414 or 416, PSU selector 220 proceeds to decision 418, where PSU selector 220 once again check whether "hot spare" conditions are met with respect to the identified operating modes of PSU-1 181A and PSU-2 181B. For example, PSU selector 220, in determining whether an applicable "hot spare" condition is met, may check whether the PSU selected to be enabled would have a combined load level over the 50% threshold. If an applicable "hot spare" condition is no longer being met at decision 418, PSU selector 220 ends the PSU-selection process and does not disable any of the PSUs 181. However, in response to the "hot spare" conditions being met, method 400 proceeds to block 410, where PSU selector 220 sends instruction to the PSU 181 selected to be disabled so as to disable the selected PSU 181 from actively supplying power.

As shown in Table 5.3, at each measurement load level, according to the conventional approach which selects the PSU with the lower efficiency value, PSU-2 181B would have been selected as the disabled PSU since the power efficiency value of PSU-2 181B is lower than that of PSU-1 181A. However, when sleep power consumption of each PSU 181 is taken into consideration, it is apparent that selecting PSU-1 181A as the disabled PSU, in accordance with the disclosed PSU-selection process, ends up consuming less system power than selecting PSU-2 181B as the disabled PSU. Therefore, the disclosed PSU-selection approach is superior to the conventional approach in terms of reducing system power consumption in a PSU shutoff situation.

According to one additional aspect of the disclosure, the PMC 182 (FIG. 1) monitors conditions within the overall system and can trigger the re-activation of the disabled PSU 181 when such re-activation is merited, based on current operating conditions, including the operating status of the enabled PSU.

FIG. 4 is directed to a two-PSU configuration. There are situations where an RPS 180 can contain N PSUs, with N being larger than 2. For example, to power an IHS 100 with a blade server configuration, an RPS 180 typically contains an array of more than two PSUs 181. Nonetheless, implementations similar to what are illustrated in FIG. 4 can be applied to an N-PSU configuration where N is larger than 2. The above described methods are not intended to limit the disclosure in any way with respect to the number of PSUs that are being or can be managed within an RPS. As a simple example, RPS 180 can include 3 PSUs, with one of the three PSUs slated for being disabled due to a hot spare condition. The above method processes can then be directly applied by evaluating each combination of two PSUs being hypothetically enabled, while the third PSU is disabled. The evaluations would then generate a resulting SPC1, SPC2, and SPC3, which would be compared to each other to determine which combination provides the best power consumption efficiency.

Figure 6:
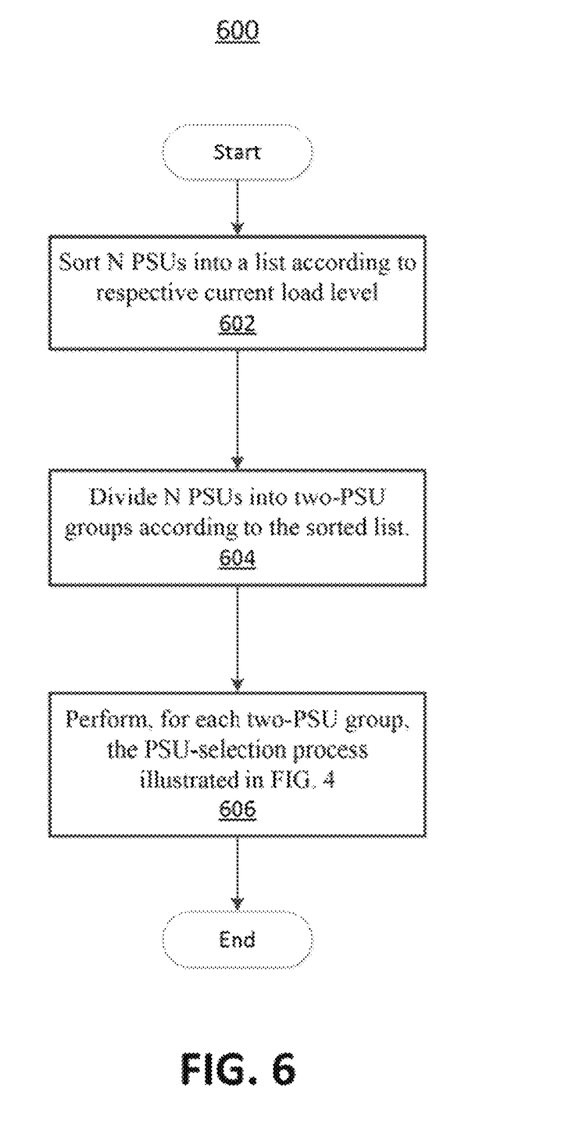
FIG. 6 is a flow chart illustrating one exemplary method of performing the process of FIG. 4 within a redundant power system having more than 2 PSUs, according to one embodiment.

FIG. 6 is a flowchart illustrating another exemplary implementation applied to an RPS 180 having N PSUs 181 with N larger than 2. Method 600 begins at block 602, at which the N PSUs 181 are sorted into a list according to their respective current load ratings, where a PSU 181 with the lowest current load rating positioned first in the list and a PSU 181 with the highest current load rating positioned last in the last.

At block 604, the N PSUs 181 are divided into two-PSU groups by grouping together two PSUs positioned at the front of the list that have not been grouped. Thus, if N is an even number, N PSUs 181 are divided into N/2 two-PSU groups. If N is an odd number, N PSUs 181 are divided into (N−1)/2 two-PSU groups, with the PSU having the highest current load rating not being grouped. As a skilled artisan readily appreciates, for the non-grouped PSU 181, which has the highest current load rating, the PSU poses the highest possibility of not meeting a "hot spare" condition when paired with another PSU. Thus, for the non-grouped PSU 181, simply no action will be taken.

At block 606, for each two-PSU group, the PSU-selection process illustrated in FIG. 4 is performed to reduce power consumption with respect to the subject two-PSU group. The PSU-selection process illustrated in FIG. 4 includes determining whether the current situation with respect to the subject two-PSU group meets applicable "hot spare" conditions. Thus, for each two-PSU group, if the group does not meet "hot spare" conditions either before or after the actual selection of the PSU 181 to be disabled, none of the PSUs 181 will be disabled as no action will be required. Otherwise, one of the two PSUs 181 is selected to be disabled according to the PSU-selection process illustrated in FIG. 4.

With the approach of this implementation, an N-PSU RPS 180 may achieve system power consumption better than the conventional approach favoring PSUs having higher or highest efficiency values. This is because each applicable two-PSU group, which is subject to the PSU-selection process illustrated in FIG. 4, may achieve system power consumption better than the aforementioned conventional approach. As a skilled artisan appreciates, there can be other implementations for an RPS 180 with an N-PSU configuration without departing from the scope and spirit of the present disclosure.

In the above described flow charts, one or more of the method processes may be embodied in a computer readable device containing computer readable program code such that a series of steps are performed when the computer readable program code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a GPU, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, microcode, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, an electronic, magnetic, optical, electromagnetic, infrared, or semiconductor system, apparatus, or device, or any suitable combination of the foregoing. More specific examples (a non-exhaustive list) of the computer readable storage device include: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that stores a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of reducing power consumption of a redundant power system (RPS) having a plurality of power supply units (PSUs) to supply power to a load, the method comprising:
 a PSU selector receiving operational data for each PSU, including a current load rating, efficiency data for a set of load ratings, and sleep power consumption data;
 computing a system power consumption for each of a plurality of configurations, where at least one different PSU is hypothetically disabled from supplying power while each remaining PSU is hypothetically enabled to supply power required for the load, each computation taking into consideration the sleep power consumption data of the hypothetically disabled at least one PSU;

comparing a resulting plurality of computed system power consumptions to identify which specific configuration of the plurality of configurations yields a lowest system power consumption; and in response to a determination that system power consumption can be reduced by implementing the specific configuration while providing a required supply power to the load, the PSU selector implementing the specific configuration of the PSUs within the RPS, wherein the at least one PSU is disabled, while the remaining PSUs are enabled.

2. The method of claim 1, further comprising triggering the computing and comparing processes in response to detection of a hot spare condition within the RPS, wherein the specific configuration is implemented while a present operating condition of the RPS remains the hot spare condition.

3. The method of claim 1, wherein implementing the specific configuration comprises:

disabling the at least one PSU from supplying power, wherein disabling the at least one PSU from supplying power places the at least one PSU into a sleep mode during which the PSU is held in readiness to supply power when required; and enabling the remaining at least one PSU to supply power required for the load.

4. The method of claim 1, wherein the RPS comprises a first PSU and a second PSU, and wherein the computing of a system power consumption for each of a plurality of configurations comprises:

computing a first system power consumption for a first configuration in which the first PSU is hypothetically disabled from supplying power and the second PSU is hypothetically enabled to supply power required by the load, taking into consideration the sleep power consumption data of the first PSU; and computing a second system power consumption for a second configuration in which the second PSU is hypothetically disabled from supplying power and the first PSU is hypothetically enabled to supply power required by the load, taking into consideration the sleep power consumption data of the second PSU.

5. The method of claim 4, wherein the computing of the system power consumption further comprises performing the computation with consideration of an efficiency value of the hypothetically enabled one of the first PSU and the second PSU at a combined load level for that hypothetically enabled PSU reflecting the combined load of the first PSU and the second PSU.

6. The method of claim 5, wherein the computing of system power consumptions further comprises:

deriving the combined load level for the hypothetically enabled one of the first PSU and the second PSU based on the received data indicating a respective current load rating of each of the first PSU and the second PSU and the respective efficiency data of the first PSU and the second PSU; and calculating the efficiency value of the hypothetically enabled PSU at the combined load level based on the respective efficiency data of the first and second PSUs.

7. A system for reducing power consumption, the system comprising:

a redundant power system having a plurality of power supply units (PSUs) supplying power to a load; and a PSU selector communicatively coupled to at least two of the plurality of the PSUs, and configured to selectively disable at least one PSU from the plurality of PSUs in order to reduce system power consumption in connection with supplying power to the load, wherein the PSU selector:

receives operational data for each PSU, including a current load rating, efficiency data for a set of load ratings, and sleep power consumption data;

computes a system power consumption for each of a plurality of configurations, where at least one different PSU is hypothetically disabled from supplying power while each remaining PSU is hypothetically enabled to supply power required for the load, each computation taking into consideration the sleep power consumption data of the hypothetically disabled at least one PSU;

compares a resulting plurality of computed system power consumptions to identify which specific configuration of the plurality of configurations yields a lowest system power consumption; and in response to a determination that system power consumption can be reduced by implementing the specific configuration while providing a required supply power to the load, implements the specific configuration of the PSUs within the RPS, wherein the at least one PSU is disabled, while the remaining PSUs are enabled.

8. The system of claim 7, wherein the PSU selector performs the computing and comparing processes in response to detection of a hot spare condition within the RPS, wherein the specific configuration is implemented while a present operating condition of the RPS remains the hot spare condition.

9. The system of claim 7, wherein to implement the specific configuration, the PSU selector:

disables the at least one PSU from supplying power, wherein disabling the at least one PSU from supplying power places the at least one PSU into a sleep mode during which the PSU is held in readiness to supply power when required; and enables the remaining at least one PSU to supply power required for the load.

10. The system of claim 7, wherein the RPS comprises a first PSU and a second PSU, and wherein to compute the system power consumption for each of a plurality of configurations, the PSU selector:

computes a first system power consumption for a first configuration in which the first PSU is hypothetically disabled from supplying power and the second PSU is hypothetically enabled to supply power required by the load, taking into consideration the sleep power consumption data of the first PSU; and computes a second system power consumption for a second configuration in which the second PSU is hypothetically disabled from supplying power and the first PSU is hypothetically enabled to supply power required by the load, taking into consideration the sleep power consumption data of the second PSU.

11. The system of claim 10, wherein in computing the system power consumptions the PSU selector performs the computation with consideration of an efficiency value of the hypothetically enabled one of the first PSU and the second PSU at a combined load level for that hypothetically enabled PSU reflecting the combined load of the first PSU and the second PSU.

12. The system of claim 11, wherein in computing the system power consumptions the PSU selector further:

derives the combined load level for the hypothetically enabled one of the first PSU and the second PSU based on the received data indicating a respective current load rating of each of the first PSU and the second PSU and the respective efficiency data of the first PSU and the second PSU; and calculates the efficiency value of the hypothetically enabled PSU at the combined load level based on the respective efficiency data of the first and second PSUs.

13. The system of claim 7, wherein the load is an information handling system and the PSU selector is included in one of (a) the information handling system and (b) the redundant power system.

14. The system of claim 7, wherein the PSU selector is communicatively coupled to the redundant power system via a communication network.

15. An information handling system comprising:
a processor;
a power system having a plurality of power supply units (PSUs) operated to supply power to the information handling system and a power management controller (PMC) communicatively coupled to the processor; and
a memory having power management code which, when executed by the processor, causes the processor to configure the PMC to selectively disable at least one PSU from the plurality of PSUs in order to reduce system power consumption in connection with supplying power to the information handling system, wherein the processor operates in tandem with the PMC to:
receive operational data for each PSU, including a current load rating, efficiency data for a set of load ratings, and sleep power consumption data;
compute a system power consumption for each of a plurality of configurations, where at least one different PSU is hypothetically disabled from supplying power while each remaining PSU is hypothetically enabled to supply power required for the load, each computation taking into consideration the sleep power consumption data of the hypothetically disabled at least one PSU;
compare a resulting plurality of computed system power consumptions to identify which specific configuration of the plurality of configurations yields a lowest system power consumption; and
in response to a determination that system power consumption can be reduced by implementing the specific configuration while providing a required supply power to the load, implement the specific configuration of the PSUs within the RPS, wherein the at least one PSU is disabled, while the remaining PSUs are enabled.

16. The information handling system of claim 15, wherein the processor performs the computing and comparing processes in response to detection of a hot spare condition within the RPS, wherein the specific configuration is implemented while a present operating condition of the RPS remains the hot spare condition.

17. The information handling system of claim 15, wherein to implement the specific configuration, the PMC:
disables the at least one PSU from supplying power, wherein disabling the at least one PSU from supplying power places the at least one PSU into a sleep mode during which the PSU is held in readiness to supply power when required; and
enables the remaining at least one PSU to supply power required for the load.

18. The information handling system of claim 15, wherein the RPS comprises a first PSU and a second PSU, and wherein to compute the system power consumption for each of a plurality of configurations, the processor:
computes a first system power consumption for a first configuration in which the first PSU is hypothetically disabled from supplying power and the second PSU is hypothetically enabled to supply power required by the load, taking into consideration the sleep power consumption data of the first PSU; and
computes a second system power consumption for a second configuration in which the second PSU is hypothetically disabled from supplying power and the first PSU is hypothetically enabled to supply power required by the load, taking into consideration the sleep power consumption data of the second PSU.

19. The information handling system of claim 18, wherein in computing the system power consumptions the processor performs the computation with consideration of an efficiency value of the hypothetically enabled one of the first PSU and the second PSU at a combined load level for that hypothetically enabled PSU reflecting the combined load of the first PSU and the second PSU.

20. The information handling system of claim 18, wherein in computing the system power consumptions the processor further:
derives the combined load level for the hypothetically enabled one of the first PSU and the second PSU based on the received data indicating a respective current load rating of each of the first PSU and the second PSU and the respective efficiency data of the first PSU and the second PSU; and
calculates the efficiency value of the hypothetically enabled PSU at the combined load level based on the respective efficiency data of the first and second PSUs.

* * * * *